United States Patent [19]
Mulrow et al.

[11] Patent Number: 5,388,145
[45] Date of Patent: Feb. 7, 1995

[54] INTERNODE ROUTING FOR A TELEPHONE SYSTEM

[75] Inventors: Robert J. Mulrow, Wheaton; Donald J. Jester, Lisle, both of Ill.

[73] Assignee: Rockwell International Corporation, El Segundo, Calif.

[21] Appl. No.: 975,241

[22] Filed: Nov. 12, 1992

[51] Int. Cl.6 .................. H04M 7/00; H04M 11/00
[52] U.S. Cl. ........................ 379/45; 379/48; 379/221
[58] Field of Search .................. 379/45–49, 379/221, 113

[56] References Cited

U.S. PATENT DOCUMENTS

| | | | |
|---|---|---|---|
| 3,881,060 | 4/1975 | Cornell et al. | 379/45 |
| 4,310,726 | 1/1982 | Asmuth | 379/45 |
| 4,400,587 | 8/1983 | Taylor et al. | 379/221 |
| 4,757,267 | 7/1988 | Riskin | 379/113 |
| 4,800,583 | 1/1989 | Theis | 379/266 |
| 4,893,325 | 1/1990 | Pankonen et al. | 379/45 |
| 4,924,491 | 5/1990 | Compton et al. | 379/49 |
| 5,195,126 | 3/1993 | Carrier et al. | 379/49 |
| 5,222,125 | 6/1993 | Creswell et al. | 379/88 |
| 5,235,630 | 8/1993 | Moody et al. | 379/45 |
| 5,239,570 | 8/1993 | Koster et al. | 379/45 |

OTHER PUBLICATIONS

E. G. DeNigris et al., "Enhanced 911: emergency calling with a plus", Mar. 1980, Bell Laboratory Record, pp. 75–79.

*Primary Examiner*—John K. Peng
*Assistant Examiner*—Daniel J. Wu
*Attorney, Agent, or Firm*—C. B. Patti; H. F. Hamann

[57] ABSTRACT

An internode routing for an emergency telephone system (14) having a first switch (16) for routing telephone calls, a second switch (18) for routing telephone calls, a device (16 or 18) for defining emergency service zones for each of the first and second switches (16 or 18), and a device (16) for transferring a telephone call placed to the first switch (16) to the second switch (18) for completion to a public safety answering point responsive to the condition of the public safety answering point being located in the emergency service zone associated with the second switch (18).

12 Claims, 2 Drawing Sheets

INTERNODE ROUTING FOR A TELEPHONE SYSTEM

BACKGROUND OF THE INVENTION

The present invention relates to internode routing for a telephone system.

In the past, telephone systems, for example emergency or 911 telephone systems have been provided in order to route telephone calls from a caller to a Public Safety Answering Point (PSAP) in the case of an emergency. Such systems have utilized switching devices for routing the calls to the correct answering point.

Such 911 telephone service for an entire state has required multiple tandem switches, with each of the switches serving a geographical area. The state is thus divided into Emergency Service Zones (ESZ) in which some of the zones overlap two tandem service areas. The caller may originate into one 911 tandem, but the Emergency Service Agency is serviced by a second 911 tandem. Thus, it is necessary that the tandems must be capable of transferring the 911 call between them in order to properly route the telephone calls.

SUMMARY OF THE INVENTION

A principal feature of the present invention is the provision of an internode routing for an emergency telephone system.

The system of the present invention comprises, first switch means for routing telephone calls, second switch means for routing telephone calls, and means for defining emergency service zones for each of the first and second switch means.

A principal feature of the present invention is the provision of means for transferring a telephone call placed to the first switch means to the second switch means.

Another feature of the invention is that the second switch means completes the call to a public safety answering point.

Still another feature of the invention is that the call is transferred responsive to the condition that the public safety answering point is located in the emergency zone associated with the second switch means.

Thus, a feature of the invention is that the call is transferred by the system to the proper switch means.

Yet another feature of the invention is that the call may be transferred by the second switch means back to the first switch means for completion.

Still another feature of the invention is that the first switch means determines the emergency service zone of the public safety answering point.

Another feature of the invention is that the emergency service zone may be associated with either the first or second switch means.

Still another feature of the invention is that the first switch means maps the telephone number of the calling party to the emergency service zone.

Yet another feature of the invention is that the first switch means maps the telephone number of the calling party to one of the switch means.

A further feature of the invention is that different emergency zones are associated with different emergency services corresponding to the telephone number of the calling party.

Still another feature of the invention is that the different emergency services have differing priorities in the emergency zones corresponding to the type of emergency.

A feature of the invention is that the second switch means determines the emergency service zone associated with the telephone number of the calling party.

Another feature of the invention is that the second switch means determines the proper switch means to service the emergency service zone associated with the telephone number of the calling party.

A feature of the invention is that telephone calls originally placed to the second switch means may be transferred to the first switch means for completion to a public safety answering point.

Further features will become more fully apparent in the following description of the embodiments of this invention, and from the appended claims.

DESCRIPTION OF THE PREFERRED EMBODIMENTS

Figure 1:
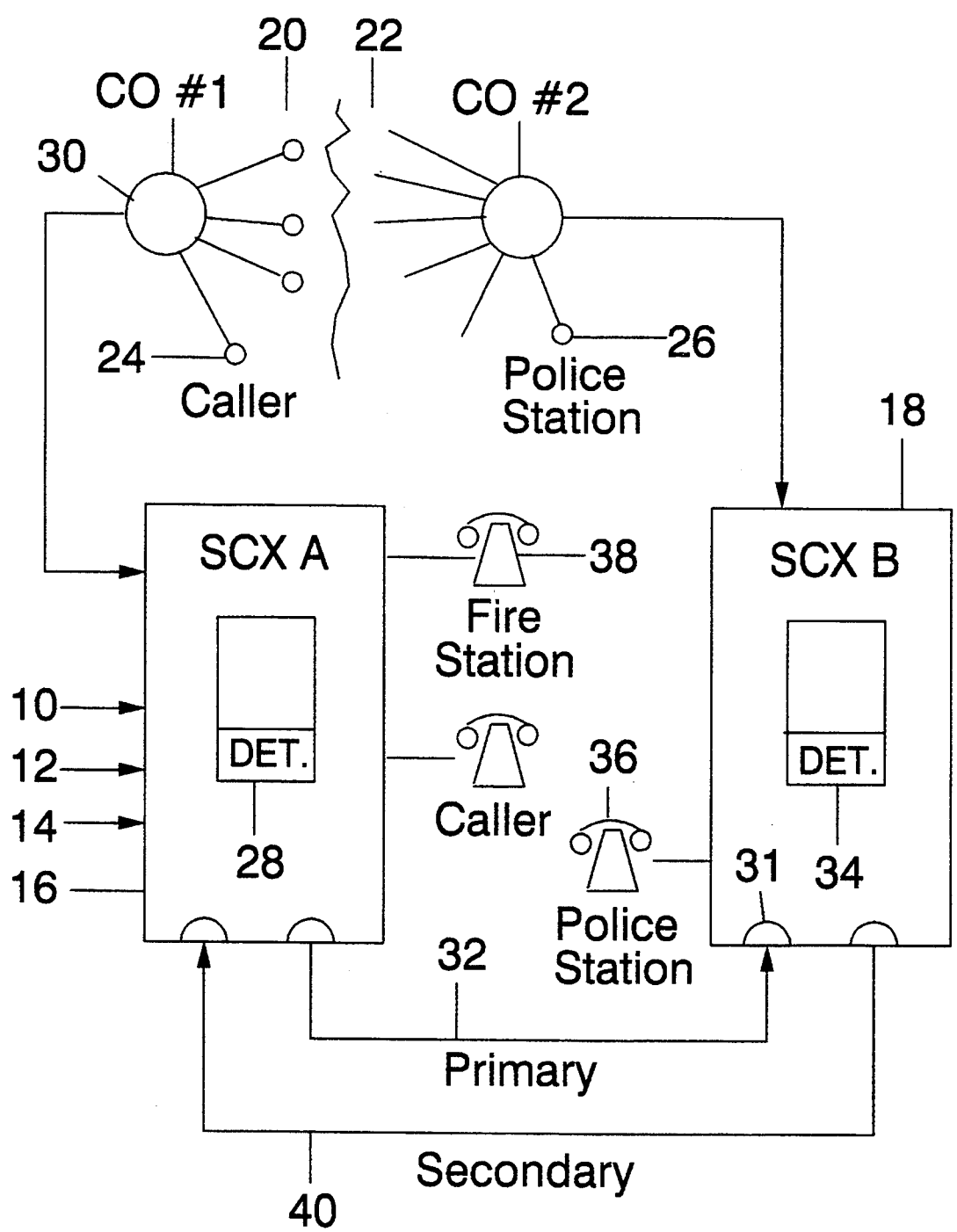
FIG. 1 is a block diagram of an internode routing for an emergency telephone system of the present invention, with calls being originally placed to first switch means in the system and being selectively transferred to second switch means in the system.

Referring now to FIG. 1, there is shown an internode routing generally designated 10 for a Public Safety Calling System (PSCS) generally designated 12 in a telephone system generally designated 14, such as an emergency 911 telephone system. In a given geographical area, such as a state, a plurality of switches are provided to route the 911 telephone calls, such as a first Specialized Communication Exchange (SCX A) switch 16, and a second Specialized Communication Exchange (SCX B) switch 18. The geographic area is divided into a plurality of Emergency Service Zones (ESZ), such as zones 20 and 22 which are associated with the switches SCX A and SCX B, respectively. Thus, telephone calls which are originally placed to the first switch SCX A are usually routed to a Public Service Answering Point (PSAP) in the zone 20, while telephone calls originally placed to the second switch SCX B are usually routed to a PSAP in the zone 22.

However, there may be some overlapping of emergency services or emergency zones in actual use. Thus, for example, a calling party 24 may be located in the first emergency zone 20 while the emergency service 26, such as a police station, may be located in the zone 22, although this PSAP is physically near to the calling party 24, and has been designated to service the calling party 24. Hence, provision must be made in the emergency telephone system 14 to properly route the call of the calling party 24 in spite of the boundaries of the emergency service zones.

For this purpose, the first switch SCX A has an expanded routing table 28 which maps the telephone number of the calling party 24 to the emergency service zones 20 or 22. The routing table 28 also maps the telephone number of the calling party 24 to a particular switch, such as SCX A or SCX B. In this case, the call of the calling party 24 has been routed through a Central Office (CO) 30 in the zone 20 to the first switch SCX A although both the calling party 24 and CO 30 are located in the zone 20, while the PSAP comprising the police station 26 is located nearby in the zone 22. In this case, the routing table 28 of the first switch SCX A will determine that this emergency service 26 is located in the zone 22, and the call must be handled by the second switch SCX B due the overlapping territories and services.

Hence, the telephone call from the calling party 24 is transferred over a primary line 32 connected from the first switch SCX A to the second switch SCX B on a special port 31 for handling. In turn, a routing table 34 of the second switch SCX B determines from the telephone number of the calling party 24 that the emergency service is located in zone 22, and should be usually handled by the second switch SCX B, such that the call is routed, for example, to a PSAP 36 comprising a police station in the zone 22 where the call is answered and the call is dispatched by radio to the proper PSAP which may be the PSAP 26 if the type of emergency should be handled by the police.

However, other types of emergencies may be required, such as a fire station or ambulance, an the proper PSAP may comprise a fire station 38 which is in the emergency zone 20 associated with the first switch SCX A. In this case, the call is transferred by the second switch SCX B back to the first switch SCX A over a secondary line 40 connected between the switches. Hence, the call over the primary and secondary lines 32 and 40 may be disconnected in this case, and the call may be handled by the first switch SCX A by routing the call to the proper PSAP for servicing the calling party 24 with the appropriate emergency service 38, with the various types of emergency services having a suitable priority dependent upon the emergency service required.

Thus, in accordance with the present invention, emergency service zones are associated with different switches, and the calls are transferred between the switches in order to direct the call to the proper emergency service which services the calling party, with the switches being interconnected on primary and secondary lines in order to make such transfers of the calls.

Figure 2:
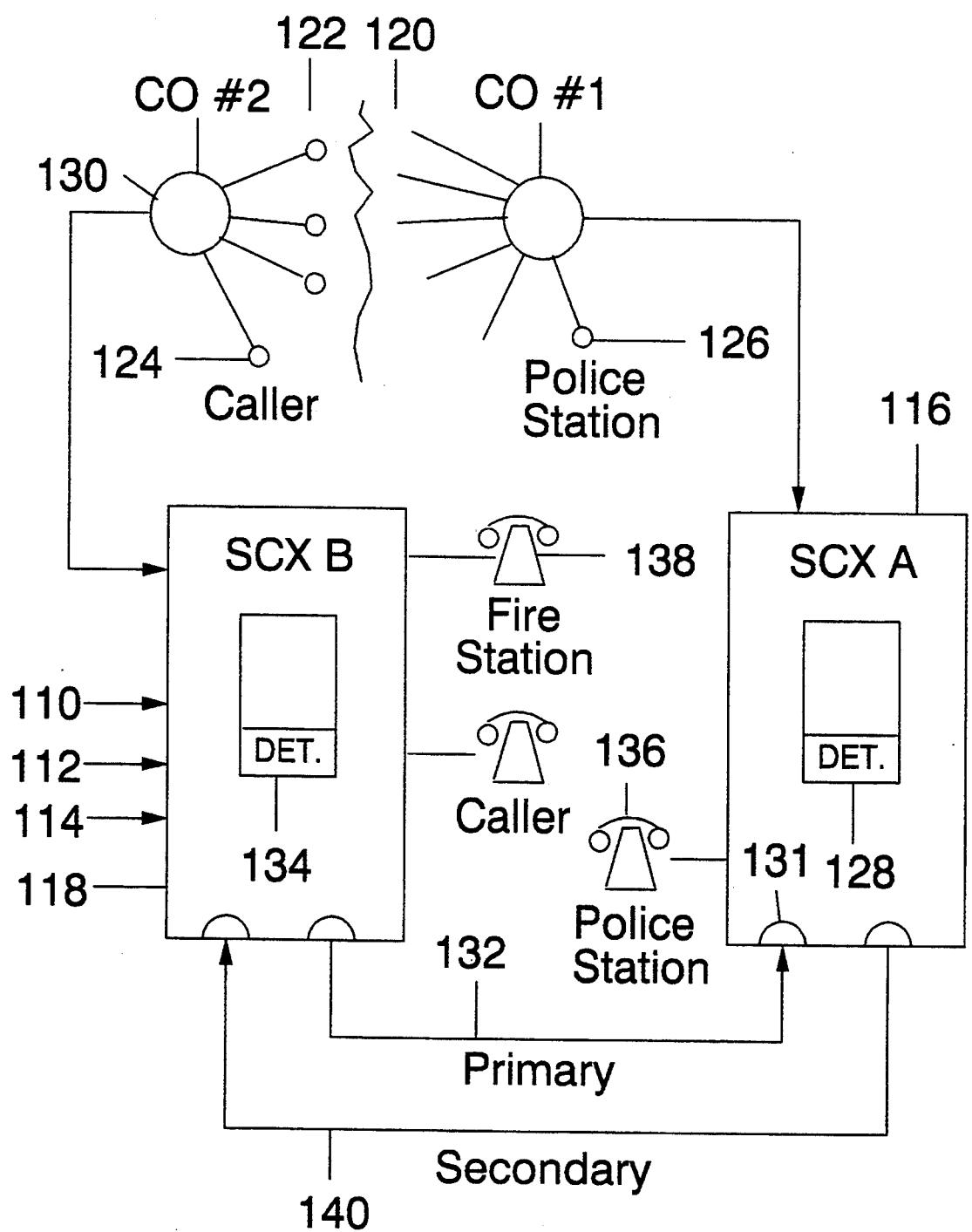
FIG. 2 is a block diagram of the system of FIG. 1 with calls being selectively transferred from the second switch means to the first switch means.

The PSCS 12 shown in the condition that the call was originally placed to the second switch means SCX B is illustrated in FIG. 2, in which like parts have been incremented by 100 as compared to the system of FIG. 1. In this case, if the emergency service is located in a different zone from the zone of the calling party, the call is transferred by the second switch SCX B to the first switch SCX A where the call is handled for routing in the same manner in which the second switch SCX B handles overflow calls from the first switch SCX A, as previously described in connection with FIG. 1. Thus, the first switch SCX A determines which PSAP should receive the call, and determines which switch should place the call either from the first switch SCX A to the PSAP, or by routing the call back to the second switch SCX B, in a manner as previously described in FIG. 1. Thus, the originating call may be placed to either switch SCX A or SCX B, and the call is properly routed directly by the original switch or by transferring the call to the other switch. In other respects, the system of FIG. 2 operates the same as previously described in connection with FIG. 1. Of course, the geographical area may have considerably more than two switches which all cooperate in transferring calls to the correct switch in a manner as previously discussed.

The foregoing detailed description has been given for clearness of understanding only, and no unnecessary limitations should be understood therefrom, as modifications will be obvious to those skilled in the art.

What is claimed is:

1. An internode routing for an emergency telephone system, comprising:

first switch means for routing emergency telephone calls;

second switch means for routing emergency telephone calls;

means for defining emergency service zones for each of the first and second switch means; and means in the first and second switch means for transferring a telephone call placed to the first switch means to the second switch means for completion to a public safety answering point responsive to a condition of the public safety answering point being located in the emergency service zone associated with the second switch means, wherein the second switch means includes means for determining whether the first or second switch means should service the emergency service zone associated with a telephone number of a calling party.

2. The system of claim 1 wherein the transferring means comprises means for interconnecting the first and second switch means.

3. The system of claim 1 including means for transferring the telephone call back from the second switch means to the first switch means for completion.

4. The system of claim 1 in which the first switch means includes means for determining the emergency service zone of the public safety answering point.

5. The system of claim 4 wherein the emergency service zone is associated with the first switch means.

6. The system of claim 4 wherein the emergency service zone is associated with the second switch means.

7. The system of claim 1 including means in the first switch means for mapping a telephone number of a calling party to the emergency service zones.

8. The system of claim 1 wherein the first switch means includes means for mapping a telephone number of a calling party to one of said switch means.

9. The system of claim 1 wherein each of said switch means is associated with an emergency service zone.

10. The system of claim 1 wherein different emergency service zones are associated with different emergency services corresponding to a telephone number of a calling party.

11. The system of claim 10 wherein different emergency services have differing priorities in the emergency zones corresponding to a type of emergency.

12. The system of claim 1 wherein the second switch means includes means for determining the emergency service zone associated with a telephone number of a calling party.

* * * * *